April 13, 1948.  A. H. SCHAAL  2,439,696
CYLINDER CAP
Filed Aug. 26, 1946
Fig.1.
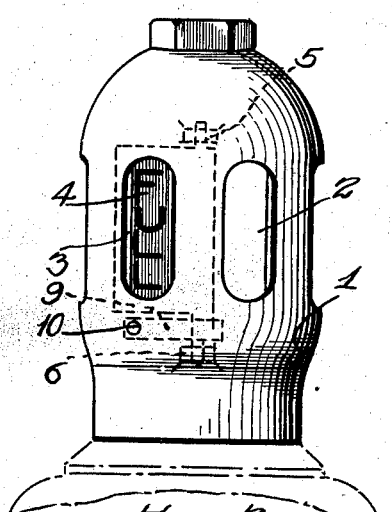
Fig.2.
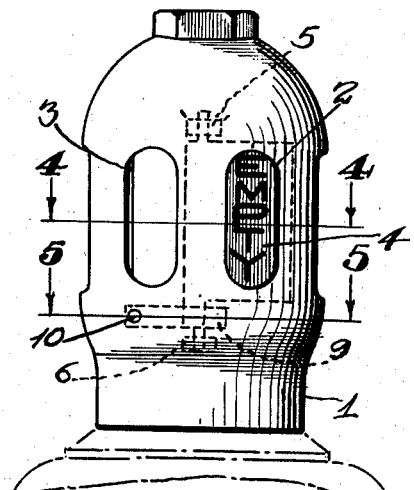
Fig.3.
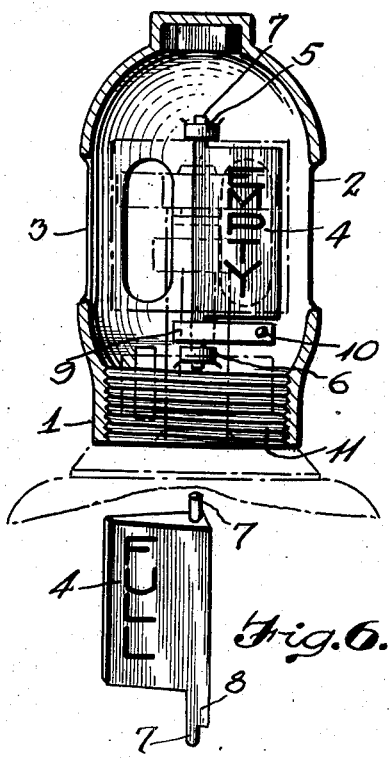
Fig.4.
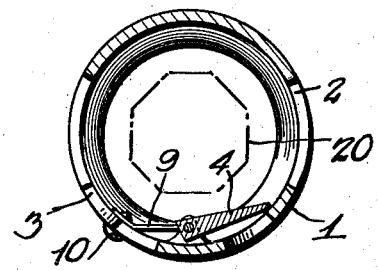
Fig.5.
Fig.6.
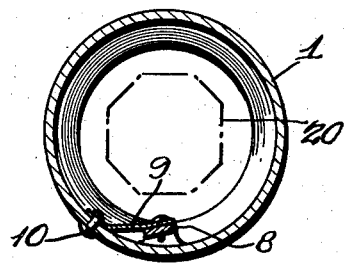
Alvin H. Schaal,
INVENTOR
BY Victor J. Evans & Co.
ATTORNEYS Patented Apr. 13, 1948

2,439,696

UNITED STATES PATENT OFFICE 2,439,696

CYLINDER CAP

Alvin H. Schaal, Butte, Mont.

Application August 26, 1946, Serial No. 693,080

2 Claims. (Cl. 116—130)

This invention relates to cylinders of the type used for holding gasses under pressure, and more particularly to the provision of an indicating cap for such cylinders.

With cylinders holding gases under high pressure it is difficult exactly to determine whether the cylinder is full or empty. Of course, if the cylinder is empty there is no loss incident to the opening of a valve to ascertain whether the cylinder contains gas; but if the cylinder is full considerable gas will be lost in opening a valve to determine its condition.

It is, therefore, an object of this invention to provide a cap which can be attached to a cylinder to indicate whether the cylinder is empty or full, or the amount therein.

A further object is to provide a cap for indicating the condition of the contents of the cylinder, said cap being manually set and prevented from being changed while attached to the cylinder.

These and other objects are attained by the novel construction and arrangement of parts hereinafter described and illustrated by the accompanying drawings, forming a part hereof, and in which:

Fig. 1 is an elevational view of an indicating cap embodying the invention.

Fig. 2 is another elevational view showing a different position of the indicator.

Fig. 3 is a sectional view of the cap.

Fig. 4 is a sectional view taken on the line 4—4 of Fig. 2.

Fig. 5 is a sectional view taken on the line 5—5 of Fig. 2.

Fig. 6 is a perspective view of an indicator flag used in the device.

Referring to the drawings, the cap is shown to comprise a casing 1 having a pair of adjacent windows 2 and 3, through which can be seen a flag 4. On one side of the flag is the word "Empty," and on the other side is the word "Full." While such words are shown in the drawings, obviously words can be used for various conditions desired to be indicated. One of the windows (see Fig. 1) displays the "Full" side of the flag, and the other window (see Fig. 2), displays the "Empty" side.

The casing is provided with a pair of bosses 5 and 6 having holes to pivotally receive pins 1 projecting from flag 4. (See Figs. 3 and 6.)

The flag 4 is provided at its lower end, near its pivoted edge, with a downwardly directed widened portion 8 from which the lower pin 7 extends, and which rests with its lower end upon the lower boss 6. A leaf spring 9 which is secured at one end, as at 10, to the casing 1, and which has its free end bearing against the flat portion 8 of the flag, holds the flag 4 against accidental movement.

In operation, the cap has threads 11 which allows it to be threadedly attached to a cylinder.

When the condition of the contents of the cylinder are desired to be indicated, the cap is set at the desired indicating position and then screwed on the cylinder. When the flag on the cap is set at the desired position and the cap is placed on the cylinder, it cannot be changed without being removed, because of interference with the valve 20 of the cylinder.

The above description is to be considered as illustrative and not limitative of the invention of which modifications can be made without departing from the spirit and scope of the appended claims.

The invention having been described, what is claimed is:

1. In an indicating device for cylindrical gas containers having threaded bosses at the ends with valves positioned in said bosses, a cap having a pair of windows in one side thereof adapted to be positioned over the valve and threaded on the boss of a cylinder, a flag pivotally mounted in the casing between the windows, and means holding the flag in either of two positions with the flag behind one window in one position, and behind the other window in the other position.

2. An indicating cap adapted to be positioned over the valve of a cylinder, comprising a casing having a plurality of windows and having a threaded lower end by which it is attached to a cylinder, a flag pivotally mounted in the casing between two windows and adapted to be actuated to either of two positions with one side positioned to show through one window or with the other side positioned to show through the other window, and spring means for holding the flag in either position.

ALVIN H. SCHAAL.